(12) United States Patent
Bullard

(10) Patent No.: US 10,465,726 B2
(45) Date of Patent: Nov. 5, 2019

(54) LOCKABLE LATERAL ADJUSTER MECHANISM

(71) Applicant: Raytheon Company, Waltham, MA (US)

(72) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 420 days.

(21) Appl. No.: 15/346,467

(22) Filed: Nov. 8, 2016

(65) Prior Publication Data
US 2018/0128303 A1  May 10, 2018

(51) Int. Cl.
*F16B 5/02* (2006.01)
*F16B 19/02* (2006.01)

(52) U.S. Cl.
CPC ............ *F16B 5/0225* (2013.01); *F16B 19/02* (2013.01); *Y10T 403/1624* (2015.01);
(Continued)

(58) Field of Classification Search
CPC . B23Q 1/25; B23Q 3/18; B23Q 3/183; B23Q 3/186; F16B 2/18; F16B 5/0024; F16B 5/0088; F16B 5/0225; F16B 5/025; F16B 19/02; F16B 39/023; F16B 39/24; Y10T 29/49942; Y10T 403/1616; Y10T 403/1624; Y10T 403/335; Y10T 403/7052; Y10T 403/7054; Y10T 403/7056; Y10T 403/7058; Y10T 403/7069; Y10T 403/75; Y10T 403/76
(Continued)

(56) References Cited

U.S. PATENT DOCUMENTS 3,006,443 A * 10/1961 Siler ................. F16B 5/025
                                                    403/408.1
3,408,924 A * 11/1968 Mueller ............. B21D 37/04
                                                    100/295
(Continued)

FOREIGN PATENT DOCUMENTS

DE      202014007350 U1    10/2014
EP          1965086 A1      9/2008
(Continued)

OTHER PUBLICATIONS

All-in-One Optical Device Alignment Stages, https://www.newport.com/f/kinematic-device-alignment-stages, date accessed is prior to the application filing date, 3 pages, Newport Corporation.
(Continued)

*Primary Examiner* — Josh Skroupa

(57) ABSTRACT

A lockable lateral adjuster mechanism comprises a platform with a channel carried by a base. A cam has an eccentric head that is pivotally disposed in the channel. The cam has a stem extending through the channel and into a counter bore in the base. The platform is laterally displaceable with respect to the base as the cam pivots. A countersunk interface is disposed between the eccentric head and the channel. A fastener extends through the cam to the base, and secures the cam, and thus the platform, to the base, and applies an axial load on the countersunk interface along an axis of rotation of the cam.

19 Claims, 5 Drawing Sheets

(52) U.S. Cl.
CPC ........ *Y10T 403/7058* (2015.01); *Y10T 403/75* (2015.01); *Y10T 403/76* (2015.01)

(58) Field of Classification Search
USPC ..... 403/13, 14, 168, 368–371, 374.4, 408.1, 403/409.1; 248/178.1, 649, 650; 29/525.01
See application file for complete search history.

(56) References Cited

U.S. PATENT DOCUMENTS

| | | | |
|---|---|---|---|
| 4,191,366 A * | 3/1980 | Rabin | B23Q 3/103 269/47 |
| 4,309,123 A * | 1/1982 | Moore | F16B 5/025 403/408.1 |
| 4,687,165 A | 8/1987 | Blackburn | |
| 5,141,357 A * | 8/1992 | Sherman | F16B 5/025 403/408.1 |
| 5,634,537 A | 6/1997 | Thorn | |
| 6,848,853 B2 * | 2/2005 | Yamada | F16B 5/025 403/3 |
| 6,966,722 B1 * | 11/2005 | Borror | F16B 5/025 403/243 |
| 7,455,471 B2 * | 11/2008 | Gawehn | F16B 5/025 403/408.1 |
| 10,125,800 B1 * | 11/2018 | Dominguez | F16B 5/0225 |
| 2006/0088398 A1 * | 4/2006 | Lund | F16B 5/0225 411/155 |
| 2009/0180831 A1 * | 7/2009 | Kendall | F16B 5/025 403/408.1 |
| 2015/0016918 A1 * | 1/2015 | Colombo | F16B 5/025 411/22 |
| 2018/0216644 A1 * | 8/2018 | Mateo | F16B 5/0225 |

FOREIGN PATENT DOCUMENTS

| | | |
|---|---|---|
| EP | 2669531 A1 | 12/2013 |
| FR | 2686949 A1 | 8/1993 |
| JP | S62-259786 A | 11/1987 |

OTHER PUBLICATIONS

XY Translation Stages with Rotating Platform, https://www.thorlabs.com/newgouppage9.cfm?objectgroup_ID=3694, date accessed is prior to the application filing date, 3 pages, Thorlabs, Inc.

PCT application PCT/US2017/050244, filing date Sep. 6, 2017, Raytheon Company, International Search Report dated Dec. 22, 2017.

* cited by examiner

LOCKABLE LATERAL ADJUSTER MECHANISM

GOVERNMENT LICENSE RIGHTS

This invention was made with government support under Contract No. Z7EBAAAU awarded by the Department of Defense. The government has certain rights in the invention.

BACKGROUND

Precision positioning can be accomplished with three degree-of-freedom (3-DOF) positioning stages. One type of positioning stage has a separate sliding joint for each DOF, which results in a stack of four plates allowing one DOF motion between any two plates. In addition, each joint can have a dovetail slide or other rail joint. The joints are commonly adjusted using a screw drive in the direction of the desired motion, resulting in the screws being orthogonal to each other. Locking the joints can be implemented, and play in the joints eliminated, by adding a locking screw to apply a side load from a fixed part of the joint onto a moving part of the joint for each stage. However, such a locking screw relies on friction in the slide to be high enough to prevent slippage.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
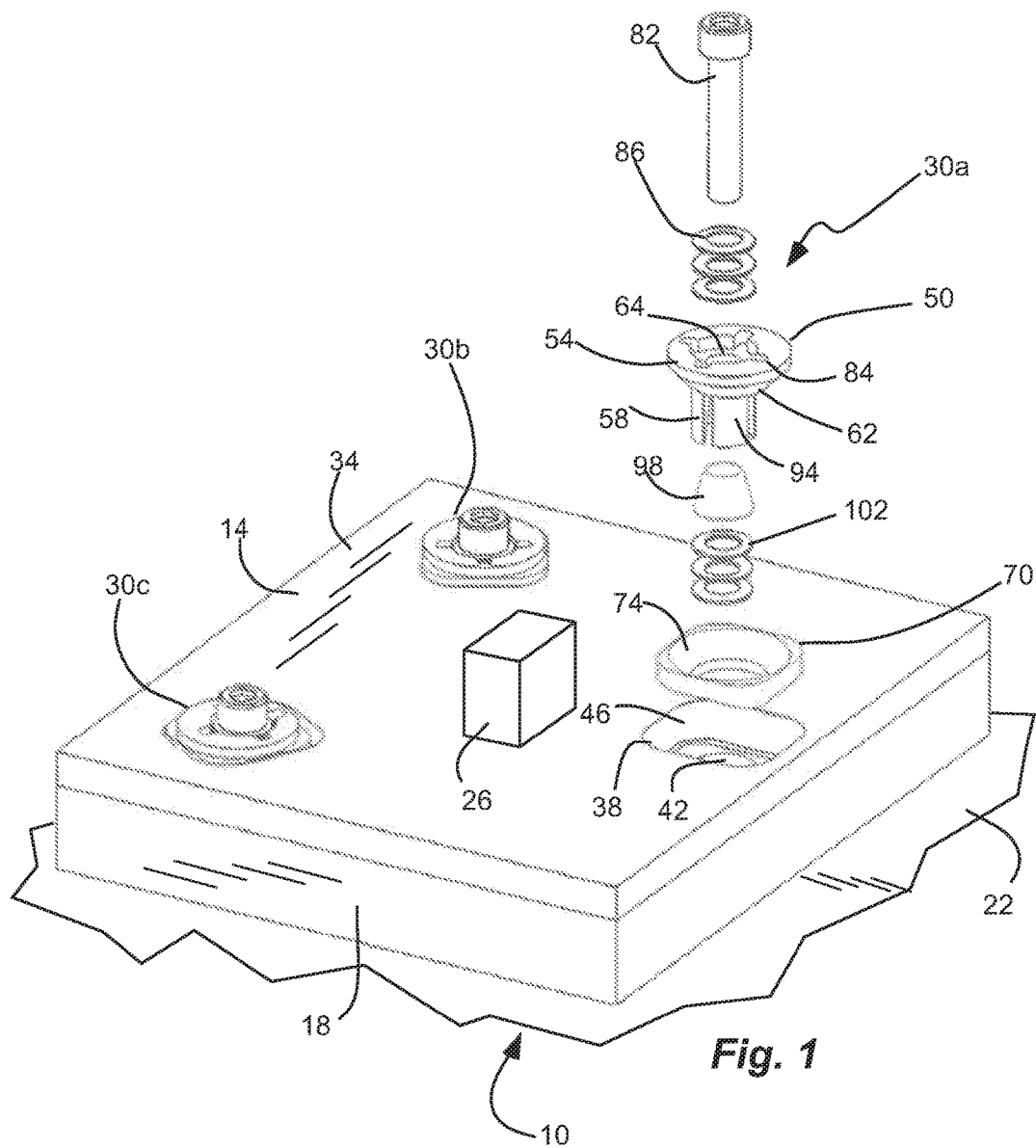
FIG. 1 is a partially-exploded perspective view of a lockable lateral adjuster mechanism in accordance with an embodiment of the present invention, shown in a first configuration.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

An embodiment of the invention presents a lockable lateral adjuster mechanism comprising a platform carried by a base. A channel is disposed in the platform opposite the base. An aperture is disposed in the channel and aligned with a counter bore in the base. A cam has an eccentric head and a stem. The eccentric head is pivotally disposed in the channel. The stem extends through the aperture in the channel and is pivotally disposed in the counter bore. The eccentric head is off-axis with respect to the stem. The platform is laterally displaceable with respect to the base as the cam pivots. A countersunk interface is disposed between the eccentric head and the channel.

In accordance with a more detailed aspect of an embodiment of the invention, the countersunk interface can comprise an inner side of the eccentric head being frusta-conical, and the channel comprising an interior bevel.

In accordance with a more detailed aspect of an embodiment of the invention, a fastener extends through a bore in the cam to the base. The fastener secures the cam, and thus the platform, to the base. The fastener is capable of applying an axial load on the countersunk interface along an axis of rotation of the cam.

In accordance with another more detailed aspect of an embodiment of the invention, a slider is movably disposed in the channel and in the countersunk interface between the head and the channel. The slider has an aperture through which the stem of the cam extends. A countersunk indentation is disposed in the slider and receives the head of the cam. The cam has a frusto-conical inner side of the head engaging the countersunk indentation of the slider. A beveled interior edge of the slider engages an interior bevel in the channel.

In accordance with another more detailed aspect of an embodiment of the invention, a conical opening is disposed in an end of the stem of the cam. The stem of the cam is segmented axially to form tabs. A cone is disposed in the counter bore of the base and extends into the conical opening of the stem. A spring is disposed in the counter bore of the base and between the base and the cone.

In accordance with another more detailed aspect of an embodiment of the invention, a set of three spaced-apart adjustments can be provided between the base and the platform, each comprising a cam. At least one cam of the three spaced-apart adjustments is pivotal to laterally displace the platform with respect to the base in a first linear direction. At least another cam of the three spaced-apart adjustments is pivotal to laterally displace the platform with respect to the base in a second linear direction, perpendicular to the first linear direction. At least one cam of the three spaced-apart adjustments being pivotal to pivot the platform with respect to the base.

An embodiment of the present invention provides a lockable lateral adjuster mechanism for precision positioning. The mechanism provides precision lateral adjustment in up to three degrees of freedom (X and Y translation and Z rotation) of a movable platform relative to a fixed base, and reduces or eliminates slop and/or play in the movement or mechanism. The mechanism also provides the ability to lock the adjustment, or position of the platform relative to the base, and can do so with standard bolted joints. The mechanism achieves excellent dimensional stability when exposed to mechanical or thermal environmental loads.

The lockable lateral adjuster mechanism fastens a movable platform to a fixed base using one or more (and in one aspect three) cam assemblies or adjustments, each of which has an eccentric cam that can push the movable platform laterally in one degree of freedom (DOF). Each cam assembly or adjustment has a cam that can be rotated with a spanner wrench, and locked with a single concentric locking screw, that both clamps the platform and the base together, and locks the position of the cam. The cam utilizes conical surfaces and V-groove surfaces with a slider, such that when the cam assembly or adjustment or joint is axially locked by the locking screw, the cam is also laterally locked. The cam can also have a spring-loaded expandable lower portion or stem that fixes a cam axis of rotation to the fixed base.

The moving platform and fixed base are only separated by a single joint, improving the stability of the platform relative to the base after environmental load exposure. Three DOF motion is achieved between the movable platform and the fixed base with a single joint, rather than a stack of four plates. In addition, all adjustments and locking are achieved with tools approaching from the same direction for ease of access. The use of a conical eccentric cam and V-bottom slider achieve both axial and lateral clamping when the single locking screw is tightened. In addition, springs can be included around the locking screw to reduce or eliminate play or backlash during adjustment in all directions.

Thus, the lockable lateral adjuster mechanism provides capability for lateral in-plane adjustment for precision devices. The use of conical seats and cam features allows precision adjustment in translation, without the significant stack height commonly associated with prior positioning stages that add packaging volume and weight. The mechanism provides a very efficient mechanization for lateral adjustment. The load transfer capacity is very significant as well because there are no sphere on flat or cylinder on flat interfaces in the load path. This allows multiple adjustments without inducing wear at high contact stress points seen on past approaches.

Figure 2A:
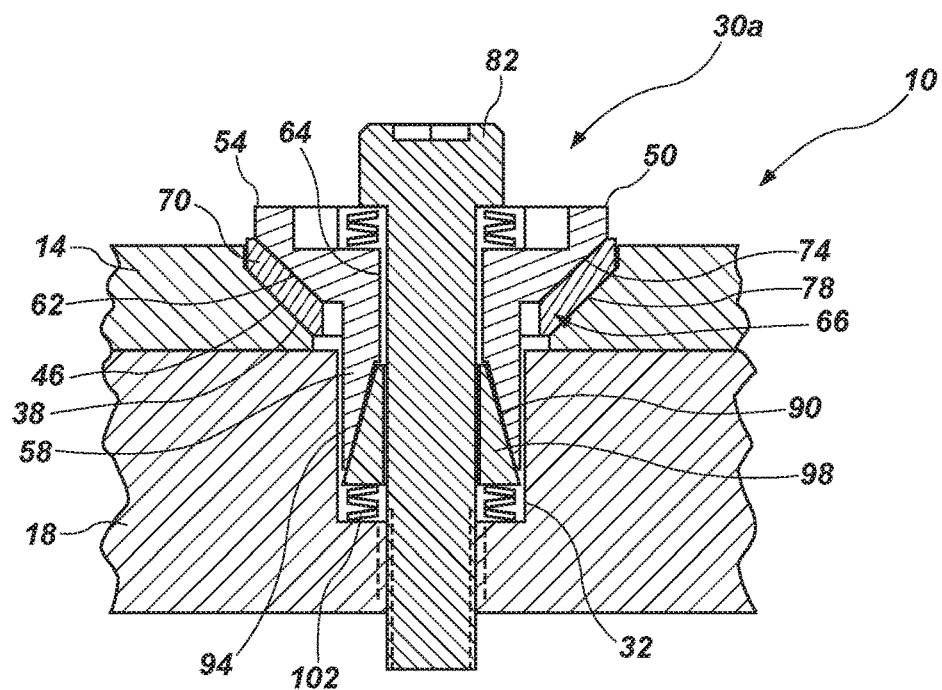
FIG. 2a is a partial cross-sectional side view of the lockable lateral adjuster mechanism of FIG. 1, taken from line 2a in FIG. 4.
Figure 2B:
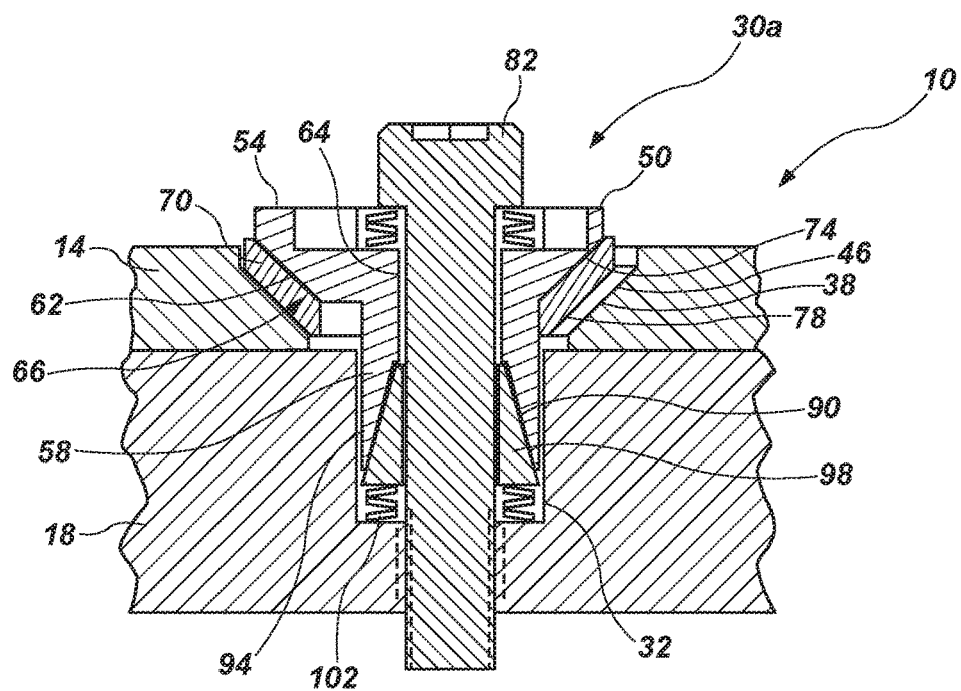
FIG. 2b is a partial cross-sectional side view of the lockable lateral adjuster mechanism 10 of FIG. 1, taken from line 2b in FIG. 4.
Figure 4:
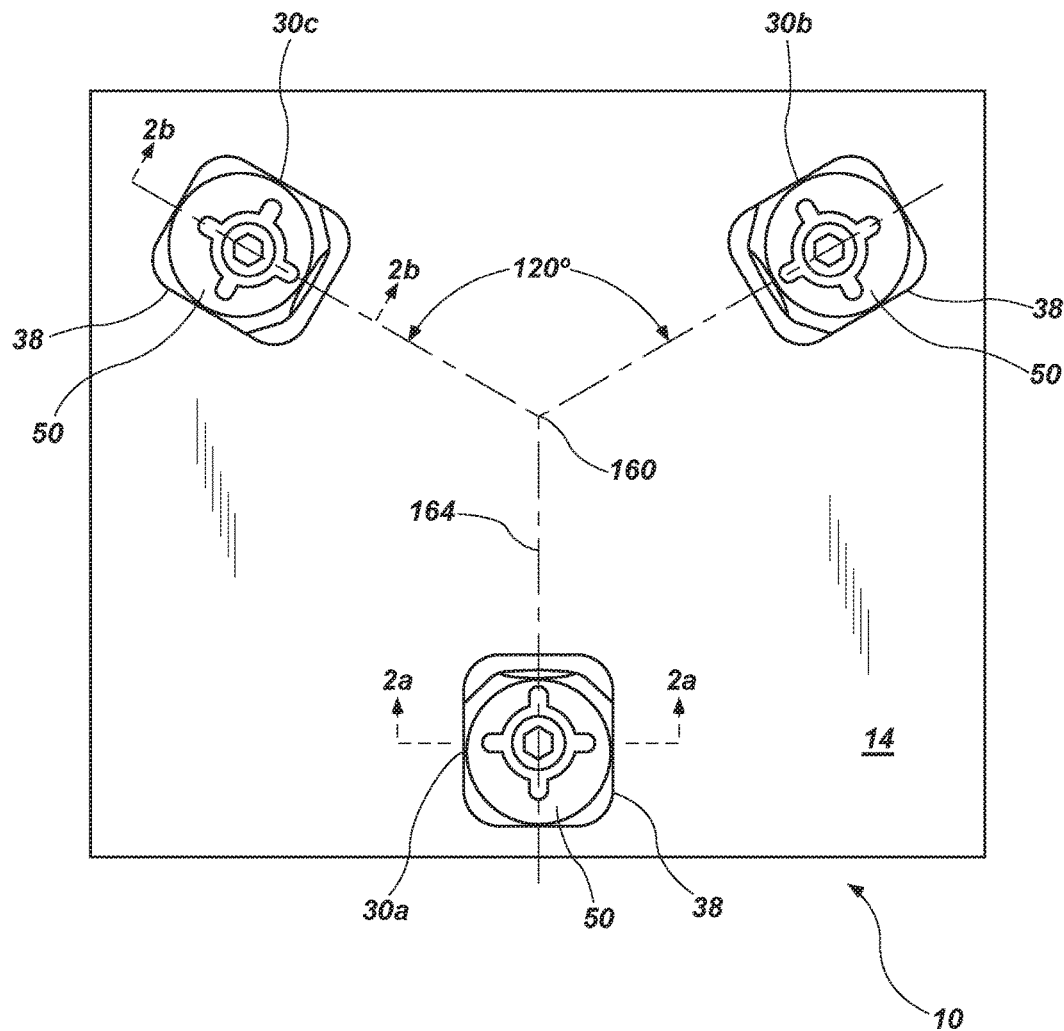
FIG. 4 is a top view of the lockable lateral adjuster mechanism of FIG. 1, shown in a first configuration.

Referring to FIGS. 1, 2a, and 2b a lockable lateral adjuster mechanism 10 is shown in an exemplary embodiment of the present invention. Specifically, FIG. 1 is a partially-exploded perspective view of a lockable lateral adjuster mechanism 10, FIG. 2a is a partial cross-sectional side view of the lockable lateral adjuster mechanism 10 taken from line 2a in FIG. 4, and FIG. 2b is a partial cross-sectional side view of the lockable lateral adjuster mechanism 10 taken from line 2b in FIG. 4. The mechanism comprises a movable platform 14 carried by a fixed base 18. The platform 14 is selectively moveable, for example, laterally and pivotally displaceable, with respect to the base 18. In addition, the platform 14 is lockable with respect to the base 18. The platform 14 and base 18 can be plates formed of metal, such as by machining or being cut from stock. Each of the platform 14 and the base 18 can have inner surfaces that abut to one another, and which can be compressed or clamped together to lock movement between the two.

In one aspect, the fixed base 18 can be affixed to a vehicle 22. The vehicle 22 can be a wheeled motorized vehicle, such as a jeep, a Humvee, a truck, etc. The vehicle 22 can be an aircraft, such as a plane, a helicopter, a drone, a dirigible, etc. The vehicle 22 can be a rocket, a satellite, etc. The vehicle 22 can be a watercraft, such as a ship, a boat, a submarine, etc. In one aspect, the base 18 or the vehicle 22 can be a military vehicle. In another aspect, the base 18 or the vehicle 22 can be a film vehicle. Indeed, those skilled in the art will recognize that the vehicle 22 can be any type of vehicle for use in any desired application. The platform 14 can carry an optical element 26 coupled to the platform 14. The optical element 26 can be a lens, a mirror, a laser, a light source, an imaging element, or others; or combinations thereof. Thus, the lockable lateral adjuster mechanism 10 can be utilized for precision positioning of the optical element 26 with respect to the vehicle 22. In another aspect, the base 18 can be a robotic manufacturing facility, and the platform 14 can carry a robotic device.

The lockable lateral adjuster mechanism 10 can have a set of three spaced-apart adjustments 30a-c disposed between the base 18 and the platform 14, as shown. A first adjustment 30a will be described herein with the understanding that the others are the same, but which can have different orientations or configuration with respect to one another. The base 18 can have a counter bore 32 disposed therein. A bottom of the counter bore 32 can be threaded with internal screw threads. The platform 14 can have an exterior face 34 opposite the base 18. A channel 38 is disposed in the platform 14 opposite the base 18, and formed in the exterior face 34. The channel 38 can be elongated, with a bottom and side walls formed in the platform 14. An aperture 42 is disposed in the bottom of the channel 38. The aperture 42 of the channel 38 is aligned with the counter bore 32 in the base 18. The channel 38 and the counter bore 32 can be machined into the plates of the platform 14 and the base 18. Each of the adjustments 30a-c has a channel 38 and counter bore 32 as described above.

The channel 38 has an interior bevel 46. The bevel 46 can be formed between the walls and the bottom of the channel 38. The bevel 46 can be formed at an angle, such as between 30 and 60 degrees, or more specifically, approximately 45 degrees. The bevel 46 can extend around an entire perimeter of the channel 38. In one aspect, the channel 38 can be countersunk into the exterior face 34 of the platform 14 to form the bevel 46.

The lockable lateral adjuster mechanism 10 also comprises a cam 50. The cam 50 has a head 54, and a stem 58 extending from the head 54. The head 54 is pivotally disposed in the channel 38, and the stem 58 extends from the head 54 and the channel 38, through the aperture 42 in the channel 38 of the platform 14, and is pivotally disposed in the counter bore 32 of the base 18. In addition, the eccentric head 54 is off-axis with respect to the stem 58, and thus the counter bore 32. Thus, as the cam 50 pivots, the platform 14 is displaced with respect to the base 18.

An inner side 62 of the eccentric head 54 is frusto-conical, or has a truncated conical shape. The conical shape of the inner side 62 of the head 54 can be formed at an angle to match the angle of the bevel 46 of the channel 38, such as having an angle of approximately 45 degrees. An axis of the conical shape of the inner side 62 of the eccentric head 54 is off-set with respect to an axis of the stem 58. Furthermore, a bore 64 extends through the cam 50, including through the head 54 and the stem 58. The cam 50 can be formed of metal, and can be formed by machining or the like. Each of the adjustments 30a-c has a cam 50 as described above.

The lockable lateral adjuster mechanism 10 comprises a countersunk interface 66 between the head 54 and the channel 38. In one aspect, the countersunk interface 66 can comprise the conical shape of the inner side 62 of the head 54, and the interior bevel 46 of the channel 38. In another aspect, the countersunk interface 66 can further comprise a slider 70 movably disposed in the channel 38 and in the countersunk interface 66 between the head 54 and the channel 38. The slider 70 has an aperture through which the stem 58 of the cam 50 extends, and aligned with the aperture 42 of the channel 38 of the platform 14, and the counter bore 32 of the base. In addition, the slider 70 has a countersunk indentation 74 disposed therein and sized and shaped to receive the head 54 of the cam 50. The frusto-conical inner side 62 of the head 54 engages the countersunk indentation 74 of the slider 70. Furthermore, the slider 70 has a beveled interior edge 78 (interior with respect to the exterior of the mechanism 10) engaging the interior bevel 46 in the channel 38. The slider 70 can be formed of metal, and can be formed by machining of the like. Each of the adjustments 30a-c has a slider 70 as described above.

The frusto-conical inner side 62 of the head 54 being countersunk into the countersunk indentation 74 of the slider 70, and the beveled interior edge 78 engaging the interior bevel 46 of the channel 38, provides axial and lateral constraint. Thus, the countersunk interface 66 provides axial and lateral constraint of the platform 14 to resist slop or play. In addition, the frusta-conical inner side 62 of the head 54 being countersunk into the countersunk indentation 74 of the slider 70, and the beveled interior edge 78 engaging the interior bevel 46 of the channel 38, provides large contact surface areas at all loaded surfaces to reduce contact stresses and reduce damage to parts after repeated cycles of adjustment and locking. Thus, the countersunk interface 66 provides a conical to conical surface to resist wear.

An axial load can be applied to the countersunk interface 66 along the axis of rotation to resist slop or play axially or laterally while adjusting and when locked. A fastener 82 extends through the bore 64 in the cam 50, and through the counter bore 32, to the base 18. In one aspect, the fastener 82 can be a socket head cap screw with external screw threads. As described above, a bottom of the counter bore 32 can have an internal screw threads. The external screw threads of the fastener 82 can engage the internal screw threads beneath the counter bore 32. Thus, the fastener 82 secures the cam 50, and thus the platform 14, to the base 18. In addition, the fastener 82 is capable of applying an axial load (along the axis of the fastener 82) on the countersunk interface 66 along an axis of rotation of the cam 50.

In one aspect, the head 54 of the cam 50 can have a recess or counter bore to receive the head of the fastener 82. In another aspect, the head 54 of the cam 50 can have notches 84 therein and located outside a perimeter of a head of the fastener 82. The notches 84 can be arrayed around the head 54 and can circumscribe the bore. Thus, a special tool can have tabs corresponding to the notches 84 to engage and selectively turn the cam 50, and selectively displace the platform 14 with respect to the base 18 as the eccentric head 54 of the cam 50 pivots. In addition, the fastener 82 can be turned by a tool, which can extend through the special tool, to tighten the fastener 82, and lock the position of the cam 50, and thus lock the position of the platform 14 with respect to the base 18. Furthermore, a preload spring 86 can be disposed between a head of the fastener 82 and the head 54 of the cam 50 to provide an axial preload during adjustment to reduce or eliminate lateral slop or play. The preload spring 86 can be one or more of a coil spring, a wavy washer, a Belleville spring, etc. Each of the adjustments 30a-c has a fastener 82 as described above.

The stem 58 of the cam 50 can have a conical opening 90 in an end thereof opposite the head 54 and open towards the counter bore 32 in the base 18. The conical opening 90 is enlarged at the opening and tapers to a reduced diameter as it extends into the stem 58. In addition, the stem 58 can be segmented axially from the end to form tabs 94. A cone 98 is disposed in the counter bore 32 of the base 18, and extends into the conical opening 90 of the stem 58. The cone 98 has a reduced diameter tip extending into the conical opening 90 in the stem 58 and an enlarged diameter at an opposite end. The cone 98 has a bore therein to receive the fastener 82 therethrough. The cone 98 can be truncated and circular. The cone 98 can be formed of metal and can be formed by machining or the like. Each of the adjustments 30a-c has a cone 98. A spring 102 can be disposed in the bore 32 of the base 18, and between the base 18 and the cone 98. The spring 102 can be one or more of a coil spring, a wavy washer, a Belleville spring, etc. The spring 102 can bias the cone 98 into the conical opening 90 of the stem 58. And the spring 102 and the cone 98 in the conical opening 90 can provide a radially expanding pin with a radial preload between the stem 58 and the counter bore 32 of the base 18 to fix the lateral position of the cam 50 with respect to the base 18. The tabs 94 allow the stem 58 to expand into contact with the counter bore 32 to resist or eliminate lateral slop or play. Thus, as the fastener 82 is tightened, not only is the head 54 of the cam 50 locked into position with the platform 14, but the stem 58 of the cam 50 is locked into position with the base 18. In addition, the stem 58 in the bore 32 provides large contact surface areas at all loaded surfaces, such as cylinder-on-cylinder contact, to reduce contact stresses and reduce damage to parts after repeated cycles of adjustment and locking.

Figure 3A:
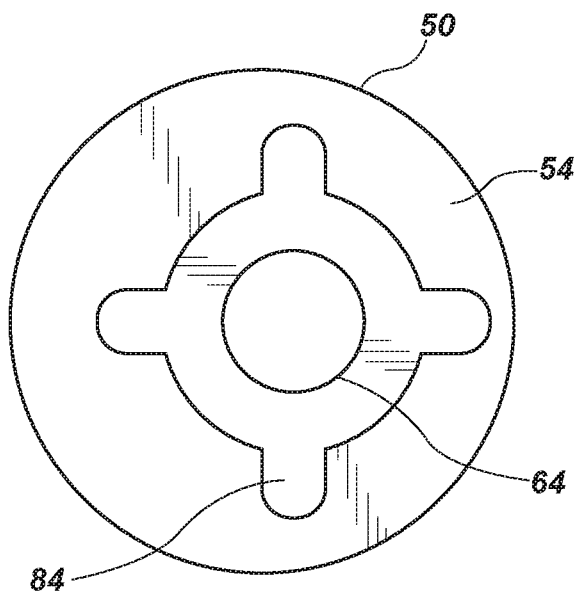
FIG. 3a is a top view of a cam of the lockable lateral adjuster mechanism of FIG. 1.

Referring to FIG. 3a, the head 54 of the cam 50 is shown with the bore 64 therethrough, and the notches 84 therein located outside a perimeter of a head of the fastener 82. In addition, the head 54 is eccentric and off-axis with respect to the stem 58.

Figure 3B:
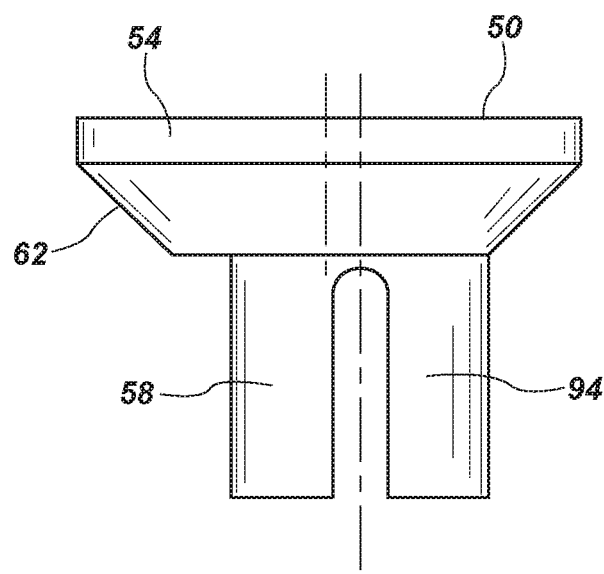
FIG. 3b is a side view of the cam of the lockable lateral adjuster mechanism of FIG. 1.

Referring to FIG. 3b, the head 54 and the stem 58 of the cam 50 are shown with the frusto-conical inner side 62 of the head 54 and the stem 58 being segmented to form the tabs 94. In addition, the head 54 and the stem 58 have axes that are off-axis with respect to one another, or that are not concentric, but spaced-apart laterally from one another. The off-set distance of these axes determines the lateral distance the platform 14 can displace with respect to the base 18. For example, for an off-set distance of 0.03 inches, the platform 14 can be displaced +/−0.03 inches when the cam 50 is rotated +/−90 degrees. The cam 50, and axis of the head 54, pivots about the axis of the stem 58. The off-set distance can be selected to obtain the lateral travel distance. The fastener 82 also rotates about the axis of the stem 58, or the axes of the fastener 82 and stem 58 (and cone 98 and counter bore 32) are concentric.

As described above, three adjustments 30a-c can be utilized to obtain lateral displacement in the x and y directions, as well as rotation about the z-axis. All three adjustments 30a-c, and the channels 38 thereof, can be formed in the exterior face 34 of the platform 14. Thus, all adjustments and locking are achieved with tools approaching from the same direction for ease of access.

Referring to FIG. 4, a layout of the three adjustments 30a-c of the lockable lateral adjuster mechanism 10 is shown in one aspect of an embodiment of the invention. The three adjustments 30a-c can be arranged equidistance (e.g. 120 degrees) about a common axis 160 with an axis 164 of the channels 38 oriented towards the common axis 160. The three cams 50 of the three adjustments 30a-c are pivotal to laterally displace the platform with respect to the base in a linear direction, such as a first linear direction. Similarly, the three cams 50 of the three adjustments 30a-c are pivotal to laterally displace the platform 14 with respect to the base 18 in another linear direction, such as a second linear direction, perpendicular to the first linear direction. Any one of the cams 50 of the three adjustments 30a-c is pivotal to pivot the platform 14 with respect to the base 18.

Figure 5A:
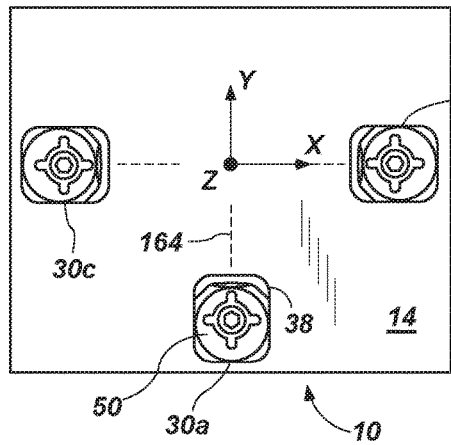
FIG. 5a-d are top views of the lockable lateral adjuster mechanism, shown in a second configuration, and showing precision adjustment of a platform with respect to a base.
Figure 5D:
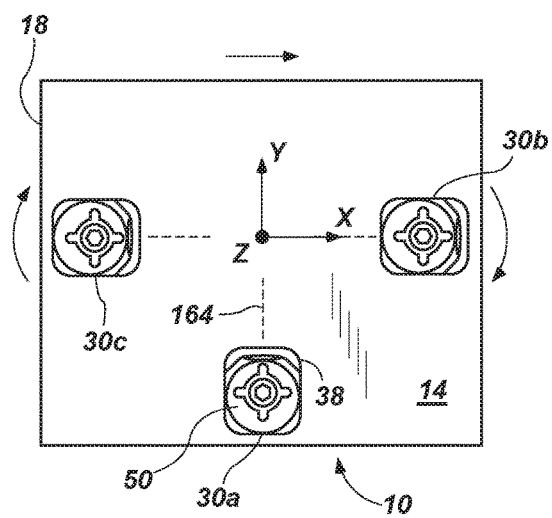
Figure 5B:
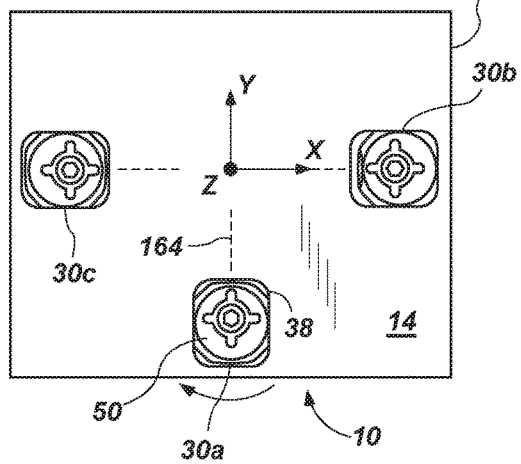
Figure 5C:
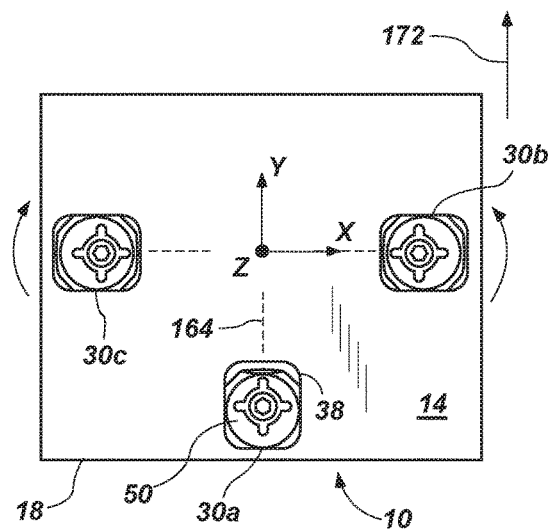

Referring to FIG. 5a, a layout of the three adjustments 30a-c of the lockable lateral adjuster mechanism 10 is shown in another aspect of an embodiment of the invention. The three adjustments 30a-c can be arranged in a T-shape, with two of the adjustments 30b and 30c oriented in a common orientation, with the axes 164 of the channels 38 being aligned and coaxial with one another, and another of the adjustments 30a oriented transverse (e.g. perpendicular) to the other two, and with its axis 164 of the channel 38 oriented transvers or perpendicular to the other two. At least one cam 50 of the three spaced-apart adjustments 30a is pivotal to laterally displace the platform with respect to the base in a first linear direction 168, as shown in FIG. 5b. Pivoting the cam 50 of the adjustment 30a translates the platform 14 in a linear direction along the axes 164 of the channels 38 of the other two adjustments 30b and 30c. At least another cam 50 of the three spaced-apart adjustments 30a is pivotal, or at least two cams 50 of another two spaced-apart adjustments 30b and 30c are pivotal, to laterally displace the platform 14 with respect to the base 18 in a second linear direction 172, perpendicular to the first linear direction 168, as shown in FIG. 5c. The two cams 50 (of adjustments 30b and 30c) are pivoted in opposite directions to translate the platform 14 in a linear direction along the axis 164 of the channel 38 of the other adjustment 30a. At least one cam 50 of the three spaced-apart adjustments (for example 30a) is pivotal, or at least two cams 50 of the three spaced-apart adjustments (for example 30b and 30c) are pivotal to pivot the platform 14 with respect to the base 18, as shown in FIG. 5d.

A method of using the mechanism 10 as described above, and for selectively displacing the platform 14 with respect to the base 18, and for locking the platform 14 with respect to the base 18, comprises: 1) turning the cam 50 to displace the platform 14 with respect to the base 18 by a desired amount; and 2) tightening the fastener 82 to apply force between the platform 14 and the base 18.

As described above, the mechanism 10 can be utilized to secure an optical element 26 to a vehicle 22 while allowing precise positioning of the optical element 26. The base 18 is fixed to the vehicle 22, and the optical element 26 is coupled to the platform 14. The optical element 26 can be a lens, a mirror, a laser, a light source, an imaging element, or others, or combinations thereof.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A lockable lateral adjuster mechanism, the mechanism comprising:
    a platform carried by a base with a channel in the platform opposite the base, and an aperture in the channel aligned with a counter bore in the base;
    a cam with an eccentric head and a stem, the eccentric head being pivotally disposed in the channel and the stem extending through the aperture in the channel and being pivotally disposed in the counter bore, the eccentric head being off-axis with respect to the stem and the platform being laterally displaceable with respect to the base as the cam pivots;
    a conical opening in an end of the stem of the cam, the stem of the cam being segmented axially to form tabs; and
    a countersunk interface between the eccentric head and the channel.

2. The mechanism of claim 1, wherein an inner side of the eccentric head is frusto-conical.

3. The mechanism of claim 2, wherein the channel comprises an interior bevel.

4. The mechanism of claim 1, further comprising:
    a fastener extending through a bore in the cam to the base, and securing the cam, and thus the platform, to the base, and capable of applying an axial load on the countersunk interface along an axis of rotation of the cam.

5. The mechanism of claim 4, wherein the head of the cam has notches therein and located outside a perimeter of a head of the fastener.

6. The mechanism of claim 4, further comprising:
    a preload spring between a head of the fastener and the head of the cam.

7. The mechanism of claim 1, further comprising:
    a slider movably disposed in the channel and in the countersunk interface between the eccentric head and the channel, and having an aperture through which the stem of the cam extends;
    a countersunk indentation disposed in the slider and receiving the eccentric head of the cam with a frusto-conical inner side of the eccentric head engaging the countersunk indentation of the slider; and a beveled interior edge of the slider engaging an interior bevel in the channel.

8. The mechanism of claim 1, further comprising:
a cone disposed in the counter bore of the base and extending into the conical opening of the stem; and
a spring disposed in the counter bore of the base and between the base and the cone.

9. A lockable lateral adjuster mechanism, the mechanism comprising:
a base with a counter bore;
a platform carried by the base and having an exterior face opposite the base;
a channel formed in the exterior face of the platform and having a bottom in the platform with an aperture aligned with the counter bore of the base;
a cam having a head and a stem, the head being pivotally disposed in the channel and the stem extending through the aperture in the channel of the platform and being pivotally disposed in the counter bore of the base, the head of the cam being eccentric with respect to the stem;
a conical opening in an end of the stem of the cam;
the platform being laterally displaceable with respect to the base as the cam pivots;
a countersunk interface between the head and the channel with an inner side of the eccentric head being frusto-conical, and the channel comprising an interior bevel; and
a fastener extending through a bore in the cam to the base, and securing the cam, and thus the platform, to the base, and capable of applying an axial load on the countersunk interface along an axis of rotation of the cam.

10. The mechanism of claim 9, wherein the head of the cam has notches therein and located outside a perimeter of a head of the fastener.

11. The mechanism of claim 9, further comprising:
a preload spring between a head of the fastener and the head of the cam.

12. The mechanism of claim 9, further comprising:
a slider movably disposed in the channel and in the countersunk interface between the head and the channel, and having an aperture through which the stem of the cam extends;
a countersunk indentation disposed in the slider and receiving the head of the cam with a frusto-conical inner side of the head engaging the countersunk indentation of the slider; and
a beveled interior edge of the slider engaging an interior bevel in the channel.

13. The mechanism of claim 9, further comprising:
the stem of the cam being segmented axially to form tabs;
a cone disposed in the counter bore of the base and extending into the conical opening of the stem; and
a spring disposed in the bore of the base and between the base and the cone.

14. A method of using the mechanism of claim 9, comprising:
turning the cam to displace the platform with respect to the base a desired amount; and
tightening the fastener to apply force between the platform and the base.

15. A lockable lateral adjuster mechanism, the mechanism comprising:
a base;
a platform carried by the base and selectively and laterally displaceable with respect to the base, the platform having an exterior face opposite the base;
a set of three spaced-apart adjustments between the base and the platform, each comprising:
a counter bore in the base;
a channel formed in the exterior face of the platform and having a bottom in the platform with an aperture aligned with the counter bore of the base;
a cam having a head and a stem, the head being pivotally disposed in the channel and the stem extending through the aperture in the channel of the platform and being pivotally disposed in the counter bore of the base, the head of the cam being eccentric with respect to the stem;
a conical opening in an end of the stem of the cam;
the platform being displaceable with respect to the base as the cam pivots;
a countersunk interface between the head and the channel;
at least one cam of the three spaced-apart adjustments being pivotal to laterally displace the platform with respect to the base in a first linear direction;
at least another cam of the three spaced-apart adjustments being pivotal to laterally displace the platform with respect to the base in a second linear direction, perpendicular to the first linear direction; and
at least one cam of the three spaced-apart adjustments being pivotal to pivot the platform with respect to the base.

16. The mechanism of claim 15, wherein each adjustment further comprises:
a fastener extending through a bore in the cam to the base, and securing the cam, and thus the platform, to the base, and capable of applying an axial load on the countersunk interface along an axis of rotation of the cam.

17. The mechanism of claim 15, further comprising:
a slider movably disposed in the channel and in the countersunk interface between the head and the channel, and having an aperture through which the stem of the cam extends;
a countersunk indentation disposed in the slider and receiving the head of the cam with a frusto-conical inner side of the head engaging the countersunk indentation of the slider; and
a beveled interior edge of the slider engaging an interior bevel in the channel.

18. The mechanism of claim 15, further comprising:
the stem of the cam being segmented axially to form tabs;
a cone disposed in the counter bore of the base and extending into the conical opening of the stem; and
a spring disposed in the bore of the base and between the base and the cone.

19. The mechanism of claim 15, wherein an inner side of the eccentric head is frusto-conical; and wherein the channel comprises an interior bevel.

* * * * *